(12) United States Patent
Eiselt et al.

(10) Patent No.: US 12,540,865 B2
(45) Date of Patent: Feb. 3, 2026

(54) APPARATUS FOR DETERMINING THE TEMPERATURE OF AT LEAST ONE FLUID

(71) Applicant: ADVA Optical Networking SE, Meiningen (DE)

(72) Inventors: Michael Eiselt, Kirchheim (DE); Florian Azendorf, Meiningen (DE); Sander Jansen, Germering (DE)

(73) Assignee: ADVA Optical Networking SE, Meiningen (DE)

( * ) Notice: Subject to any disclaimer, the term of this patent is extended or adjusted under 35 U.S.C. 154(b) by 442 days.

(21) Appl. No.: 18/096,290

(22) Filed: Jan. 12, 2023

(65) Prior Publication Data
US 2023/0221190 A1    Jul. 13, 2023

(30) Foreign Application Priority Data
Jan. 13, 2022 (EP) .................................... 22151428

(51) Int. Cl.
*G01K 11/32* (2021.01)
*G01D 5/26* (2006.01)
*G01N 21/45* (2006.01)

(52) U.S. Cl.
CPC ............. *G01K 11/32* (2013.01); *G01D 5/268* (2013.01); *G01N 21/45* (2013.01)

(58) Field of Classification Search
CPC .... G01K 11/32; G01K 11/3206; G01D 5/268; G01N 21/45
See application file for complete search history.

(56) References Cited

U.S. PATENT DOCUMENTS

| | | | |
|---|---|---|---|
| 5,231,681 A * | 7/1993 | Bergqvist | G01K 5/46 374/E5.028 |
| 6,056,436 A * | 5/2000 | Sirkis | G01K 11/3206 374/161 |
| 10,494,914 B2 * | 12/2019 | Johnston | E21B 47/113 |

(Continued)

*Primary Examiner* — Laura Martin
*Assistant Examiner* — Philip L Cotey
(74) *Attorney, Agent, or Firm* — The Webb Law Firm

(57) ABSTRACT

Provided is an apparatus for determining the temperature of at least one fluid. The apparatus includes an optical fiber. A first end of the optical fiber is connected to at least one fiber tip, and a first additional reflector is introduced into the at least one fiber tip at a first predetermined distance from an outer end of the at least one fiber tip. A second end of the optical fiber is connected to a processing apparatus. The processing apparatus includes an optical source. The optical source is configured to launch an optical signal into the optical fiber, and a coherent detector. The coherent detector is configured to determine the temperature of at least one fluid by receiving a first light signal that corresponds to parts of the optical signal that are reflected at the outer end of the at least one fiber tip when the at least one fiber tip is inserted into the at least one fluid and a second light signal that corresponds to parts of the optical signal that are reflected at the first additional reflector when the at least one fiber tip is inserted into the at least one fluid, determining a difference of the optical phases of the first light signal and the second light signal, and determining the temperature of the at least one fluid based on the difference of the optical phases of the first light signal and the second light signal.

20 Claims, 2 Drawing Sheets

(56) References Cited

U.S. PATENT DOCUMENTS

| | | | |
|---|---|---|---|
| 2007/0006663 A1* | 1/2007 | Zerwekh | G01L 9/0077 |
| | | | 374/E11.016 |
| 2008/0030741 A1* | 2/2008 | Digonnet | G01D 5/3538 |
| | | | 356/483 |
| 2009/0034901 A1* | 2/2009 | Takabayashi | G01F 23/2925 |
| | | | 385/12 |
| 2014/0204384 A1* | 7/2014 | Lee | G01N 21/7703 |
| | | | 427/532 |
| 2017/0010133 A1* | 1/2017 | Barfoot | G01D 5/35306 |
| 2018/0223647 A1* | 8/2018 | Johnston | E21B 47/113 |
| 2019/0212212 A1* | 7/2019 | Hull | G01N 25/16 |
| 2020/0363241 A1* | 11/2020 | Anderson | G01D 5/35316 |
| 2021/0052173 A1* | 2/2021 | Desjardins | G01F 1/688 |
| 2021/0164894 A1* | 6/2021 | Prater | G01N 21/35 |
| 2021/0333189 A1* | 10/2021 | Trainer | G01N 15/0211 |
| 2022/0003826 A1* | 1/2022 | Ohodnicki | G01R 33/0322 |

* cited by examiner

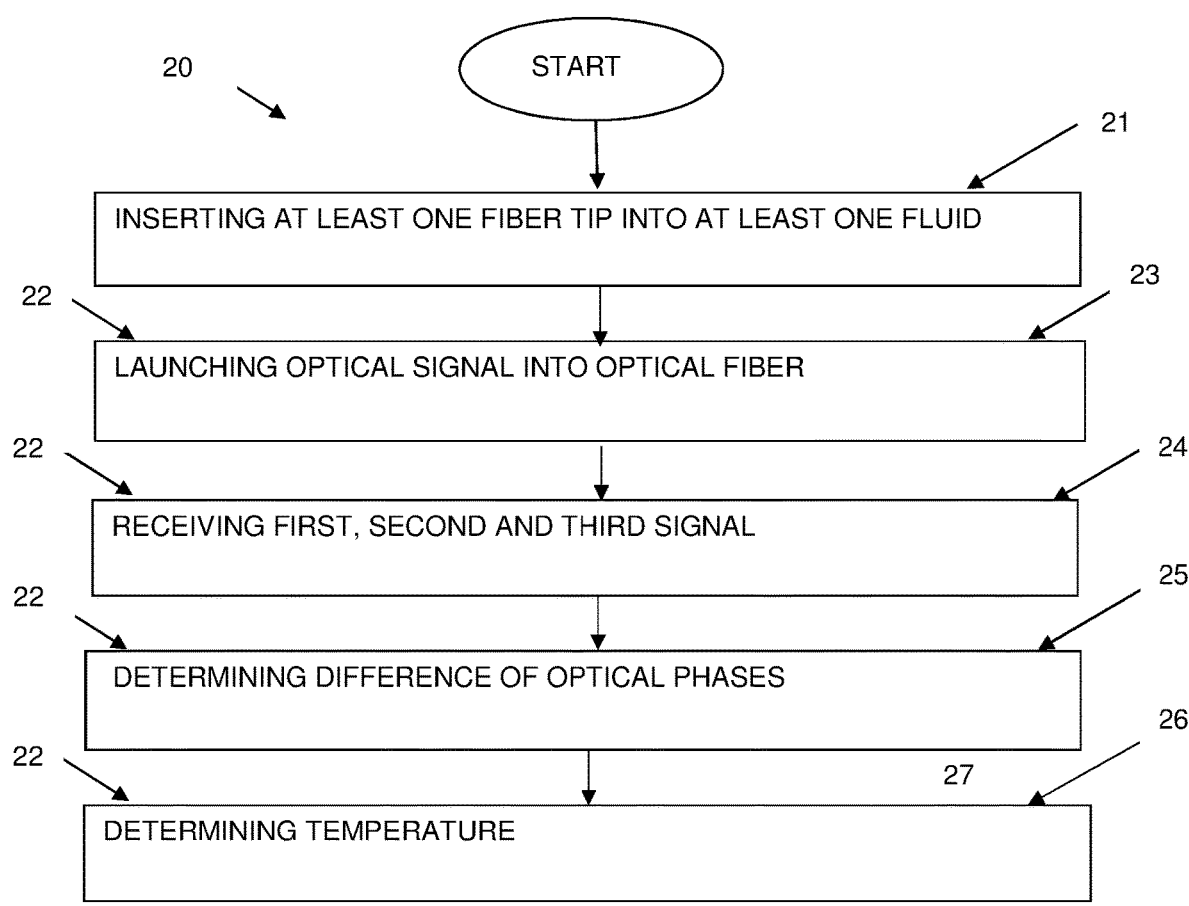

APPARATUS FOR DETERMINING THE TEMPERATURE OF AT LEAST ONE FLUID

CROSS-REFERENCE TO RELATED APPLICATION

This application claims priority to European Patent Application No. 22151428.4 filed Jan. 13, 2022, the disclosure of which is hereby incorporated by reference in its entirety.

BACKGROUND OF THE INVENTION

Field of the Invention

The present invention relates to an apparatus for determining the temperature of at least one fluid, and in particular, to an apparatus for determining the temperature of at least one fluid with increased accuracy, wherein the apparatus comprises an optical fiber.

Description of Related Art

During chemical or biological tests, for example a PCR (polymerase chain reaction) test, the temperature of a small amount of fluid needs to be measured. For example, during chemical or biological tests it can be required to monitor the temperature change which accompanies a reaction. Therein, the accuracy and precision of the apparatus that is used to monitor the temperature are one of the main factors which affect such measurement.

Regarding for example PCR tests, it is known to not directly monitor the temperature, but to monitor the temperature of a heating plate on which the temperature of the corresponding fluid depends. Further, it is known to use metallic resistance sensors to measure the temperature of a fluid, wherein, however, metallic resistance sensors are usually large and can have a probe diameter of at least 1 mm, which is not suitable for measuring or determining the temperature of a small amount of fluid.

In order to save costs, there have also been attempts to monitor the temperature of fluids based on fiber optics or fiber optic cables. A fiber optic cable is an assembly similar to an electrical cable but containing one or more optical fibers used to carry light. Apparatuses for monitoring or determining a temperature that comprise a fiber optic or fiber-optic temperature sensors, respectively, are commonly used in given applications as an advantageous alternative to thermocouples and the like. Fiber-optic temperature sensors are immune to electromagnetic interference or radio-frequency interference, respectively. Moreover, fiber-optic temperature sensors are relatively small and can withstand hazardous environments, including relatively extreme temperatures.

For example, apparatuses for monitoring or determining the temperature of a fluid that comprises an optical fiber are known that are based on fiber bragg gratings or arrays thereof, which are, however, usually longer than 10 mm and require a complex spectral analysis for interrogation. Other known solutions require a complex interrogation, for example fiber modal interferometers, or have a complex measurement setup, for example apparatuses that comprise a liquid filled fiber. Therefore, there is a need for an improved apparatus for determining the temperature of at least one fluid that comprises a fiber optic.

The document U.S. Pat. No. 5,231,681 A discloses an optical fibre cable for detecting a change in temperature, said fibre cable including an elongated temperature-responsive device and an optical fibre in abutment with said temperature-responsive device and fastened thereto by means of a fastening device which embraces the fibre and the temperature-responsive device, wherein a light pulse transmitted into a non-influenced fibre cable from one end thereof is attenuated generally uniformly along the length of the fibre and wherein the light pulse is further attenuated when the optical fibre is bent by the temperature-responsive device, wherein the temperature-responsive device includes an elastic tube which contains a detector material whose coefficient of cubic expansion is within a temperature detecting range, in which said detector material changes from one phase to another phase, and has a value which exceeds the value of the coefficient of cubic expansion in adjacent temperature ranges.

SUMMARY OF THE INVENTION

It is an object of the present application to provide an improved apparatus for determining the temperature of at least one fluid.

According to one embodiment of the invention, this object is solved by an apparatus for determining the temperature of at least one fluid, wherein the apparatus comprises an optical fiber, wherein a first end of the optical fiber is connected to at least one fiber tip, and a first additional reflector introduced into the at least one fiber tip at a first predetermined distance from an outer end of the at least one fiber tip, and wherein a second end of the optical fiber is connected to a processing apparatus, wherein the processing apparatus comprises an optical source, wherein the optical source is configured to launch an optical signal into the optical fiber, and a coherent detector, wherein the coherent detector is configured to determine the temperature of at least one fluid by receiving a first light signal that corresponds to parts of the optical signal that are reflected at the outer end of the at least one fiber tip when the at least one fiber tip is inserted into the at least one fluid and a second light signal that corresponds to parts of the optical signal that are reflected at the first additional reflector when the at least one fiber tip is inserted into the at least one fluid, determining a difference of the optical phases of the first light signal and the second light signal, and determining the temperature of the at least one fluid based on the difference of the optical phases of the first light signal and the second light signal.

Here, a coherent detector is a detector in which both the phase and the amplitude of the received signals are used and analyzed. Coherent detectors usually have a high sensitivity and are also suitable to detect or determine the phase change.

Therein, a first additional reflector being introduced into the at least one fiber tip at a first predetermined distance from an outer end of the at least one fiber tip or an end of the fiber tip opposite to an end of the fiber tip that is connected to the optical fiber means that a reference reflection is introduced to define a predetermined or desired measurement section.

When an optical signal, for example light, propagates in a medium, for example an optical fiber, the light wave undergoes a phase shift, wherein the phase shift can be defined as a function of the temperature. By further introducing a reference reflection, the accuracy of the determination of the temperature can be increased without having to costly amend the apparatus as such.

Thus, an improved apparatus for determining the temperature of at least one fluid is provided.

In one embodiment, the apparatus further comprises a second additional reflector that is introduced in the at least one fiber tip at a second predetermined distance from the first additional reflector.

A second additional reflector being introduced into the at least one fiber tip at a second predetermined distance from the first additional reflectometer means that a further, second reference reflection is introduced to define a further predefined or desired measurement selection.

In particular, as the phase change between the first light signal and the second light signal is usually periodic over the temperature, this second additional reflector can, for example, be used as additional reflection with shorter distance to increase a range of unique measurements.

Therein, the coherent detector can be configured to determine the temperature of the at least one fluid by receiving the first light signal, the second light signal and a third light signal that corresponds to parts of the optical signal that are reflected at the second additional reflector when the at least one fiber tip is inserted into the fluid, by determining a difference of the optical phases of the first light signal and the second light signal and a difference of the optical phases of the second light signal and the third light signal, and by determining the temperature of the at least one fluid based on the difference of the optical phases of the first light signal and the second light signal and the difference of the optical phases of the second light signal and the third light signal.

Therein, the temperature of the at least one fluid being determined based on the difference of the optical phases of the first light signal and the second light signal and the difference of the optical phases of the second light signal and the third light signal can for example mean that first, an approximate value of the temperature can be determined based on the difference of the optical phases of the first light signal and the second light signal, wherein, thereafter, a more exact value of the temperature can be determined based on the difference of the optical phases of the second light signal and the third light signal, and wherein the first predetermined distance is greater than the first predetermined distance. Thus, the determining range can be optimized by simultaneously using two different measurement sections, wherein the determining range can be increased based on a first phase change, and wherein, at the same time, also the accuracy of the determined temperature can be further improved based on a second phase change.

In a further embodiment, the apparatus comprises a plurality of fiber tips, wherein the apparatus is configured in such a way that all fiber tips can simultaneously be inserted into a plurality of fluids in such a way that each of the plurality of fiber tips is inserted in a different one of the plurality of fluids, and wherein the processing apparatus is configured to determine the temperature of each of the plurality of fluids. Thus, multiple fiber tips can be used in parallel, thereby increasing the capacities of a corresponding test, wherein the signals of the plurality of fiber tips can be multiplexed, for example time multiplexed via delay lines, and wherein the signal processor can be programmed in such a way that it respectively knows when the signals of each of the plurality of fiber tips are processed.

Further, the processing apparatus can be a coherent optical time domain reflectometer.

An optical domain reflectometer (OTDR) periodically transmits a detection pulse to an optical fiber. The detection pulse will have Fresnel reflection at certain points in the fiber, where the refractive index changes or imperfections are introduced in the fiber. The Fresnel reflection signal from the optical signal is then received and analyzed. A coherent optical time domain reflectometer (COTDR) further works by means of coherent detection technology.

Compared for example to optical time domain reflectometers, coherent optical time domain reflectometers have an improved sensitivity and are suitable to detect and determine a phase change, for example the difference of the optical phases of the first light signal and the second light signal.

According to a further embodiment of the invention, a system for determining the temperature of at least one fluid is provided, wherein the system comprises at least one fluid reservoir and an apparatus for determining the temperature of at least one fluid as described above, wherein the apparatus for determining the temperature of at least one fluid is configured to determine the temperature of at least one fluid contained in the at least one fluid reservoir.

Thus, a system for determining the temperature of at least one fluid is provided that is based on an improved apparatus for determining the temperature of at least one fluid. In particular, the system is based on an apparatus that takes into account that, when an optical signal, for example light, propagates in a medium, for example an optical fiber, the light wave undergoes a phase shift, wherein the phase shift can be defined as a function of the temperature. By further introducing a reference reflection, the accuracy of the determination of the temperature can be increased without having to costly amend the apparatus as such.

According to yet a further embodiment of the invention, a method for determining the temperature of at least one fluid is provided, wherein the method comprises inserting at least one fiber tip into at least one fluid, wherein the fiber tip is connected to an optical fiber, and wherein a first additional reflector is introduced into the at least one fiber tip at a first predetermined distance from an outer end of the at least one fiber tip, and determining the temperature of the at least one fluid through a processing apparatus that is connected to a second end of the optical fiber by launching an optical signal into the optical fiber, receiving a first light signal that corresponds to parts of the optical signal that are reflected at the outer end of the at least one fiber tip and a second light signal that corresponds to parts of the optical signal that are reflected at the first additional reflector, determining a difference of the optical phases of the first light signal and the second light signal, and determining the temperature of the at least one fluid based on the difference of the optical phases of the first light signal and the second light signal.

Thus, an improved method for determining the temperature of at least one fluid is provided. In particular, the method takes into account that, when an optical signal, for example light, propagates in a medium, for example an optical fiber, the light wave undergoes a phase shift, wherein the phase shift can be defined as a function of the temperature. By further introducing a reference reflection, the accuracy of the determination of the temperature can be increased without having to costly amend the apparatus as such.

In one embodiment, a second additional reflector is introduced in the at least one fiber tip at a second predetermined distance from the first additional reflector, and wherein the step of determining the temperature of the at least one fluid through the processing apparatus comprises launching an optical signal into the optical fiber, receiving the first light signal, the second light signal and a third light signal that corresponds to parts of the optical signal that are reflected at the second additional reflector when the at least one fiber tip is inserted into the fluid, determining a difference of the optical phases of the first light signal and the second light signal and a difference of the optical phases of the second light signal and the third light signal, and determining the temperature of the at least one fluid based on the difference of the optical phases of the first light signal and the second light signal and the difference of the optical phases of the second light signal and the third light signal. Thus, the determining range can be optimized by simultaneously using two different measurement sections, wherein the determining range can be increased based on a first phase change, and wherein, at the same time, also the accuracy of the determined temperature can be further improved based on a second phase change.

In a further embodiment, a plurality of fiber tips are simultaneously inserted into a plurality of fluids in such a way that each of the plurality of fiber tips is inserted in a different one of the plurality of fluids, and wherein the temperature of each of the plurality of fluids is determined by the processing apparatus. Thus, multiple fiber tips can be used in parallel, thereby increasing the capacities of a corresponding test, wherein the signals of the plurality of fiber tips can be multiplexed, for example time multiplexed via delay lines, and wherein the signal processor can be programmed in such a way that it respectively knows when the signals of each of the plurality of fiber tips are processed.

The processing apparatus includes a coherent detector. Coherent detectors usually have a high sensitivity and are suitable to detect or determine the phase change.

Therein, the processing apparatus can be a coherent optical time domain reflectometer. Compared to, for example, to optical time domain reflectometers, coherent optical time domain reflectometers have an improved sensitivity and are suitable to detect and determine a phase change, for example the difference of the optical phases of the first light signal and the second light signal.

BRIEF DESCRIPTION OF THE DRAWINGS

Embodiments of the invention will now be described with reference to the drawings.

FIG. 2 illustrates a flowchart of a method for determining the temperature of at least one fluid according to a first embodiment;

DESCRIPTION OF THE INVENTION

Figure 1:
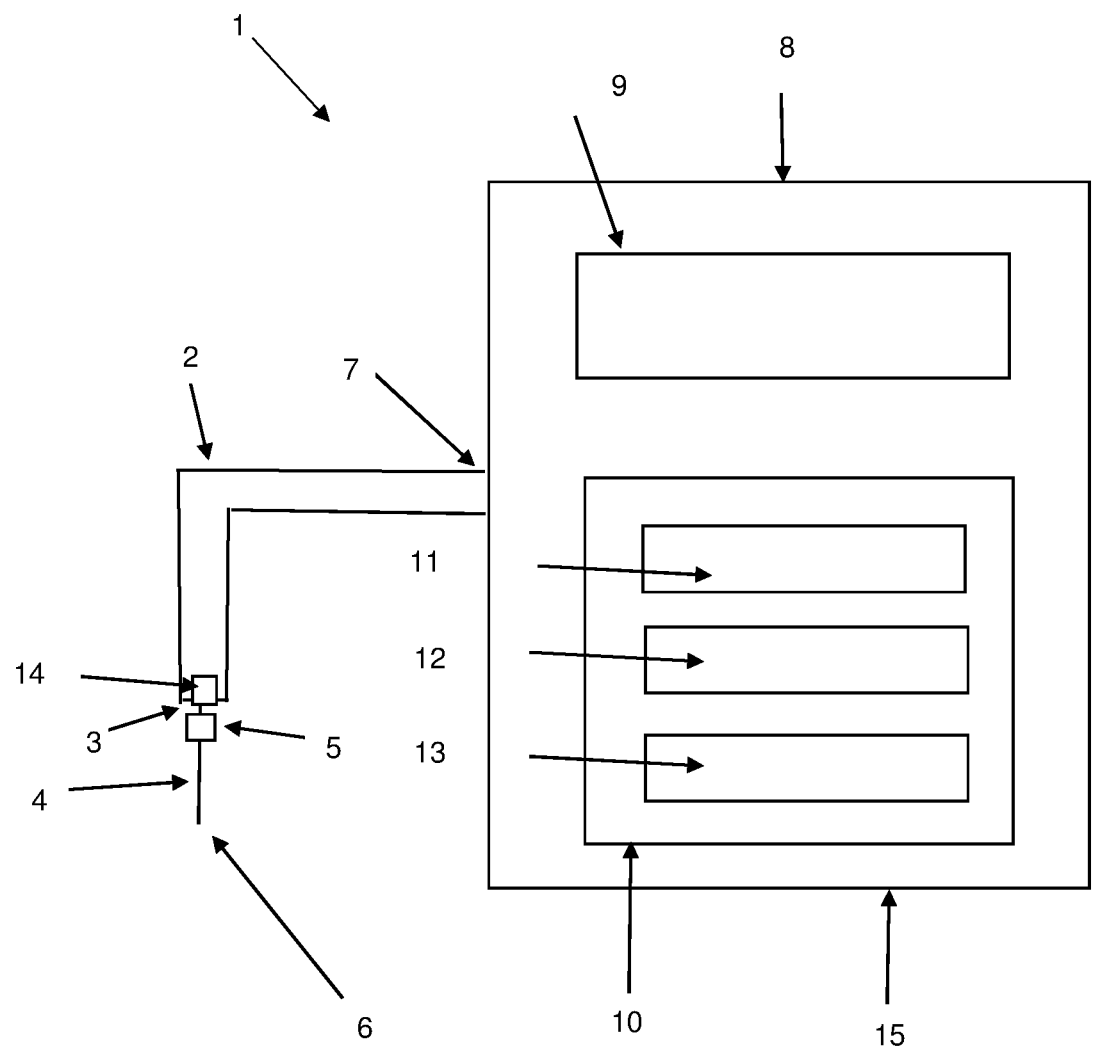
FIG. 1 illustrates an apparatus for determining the temperature of at least one fluid according to embodiments of the invention.

FIG. 1 illustrates an apparatus for determining the temperature of at least one fluid 1 according to embodiments of the invention.

During chemical or biological tests, for example a PCR (polymerase chain reaction) test, the temperature of a small amount of fluid needs to be measured. For example, during chemical or biological tests, it can be required to monitor the temperature change which accompanies a reaction. Therein, the accuracy and precision of the apparatus that is used to monitor the temperature are one of the main factors which affect such measurement.

During such chemical or biological tests, a small amount of fluid, for example 100 μl, is usually inserted into small wells, wherein a plurality of wells can be contained in a common plate, and wherein each well usually has a depth of approximately only 20 mm.

According to the embodiments of FIG. 1, an apparatus for determining the temperature of at least one fluid 1 is provided, wherein the apparatus 1 comprises an optical fiber 2, wherein a first end of the optical fiber 3 is connected to at least one fiber tip 4, and a first additional reflector 5 introduced into the at least one fiber tip 3 at a first predetermined distance from an outer end of the at least one fiber tip 6, and wherein a second end of the optical fiber 7, opposite the first end of the fiber tip 3, is connected to a processing apparatus 8, wherein the processing apparatus 8 comprises an optical source 9, wherein the optical source 9 is configured to launch an optical signal into the optical fiber 2, and a coherent detector 10, wherein the coherent detector 10 is configured to determine the temperature of at least one fluid and comprises a receiving device 11 that is configured to receive a first light signal that corresponds to parts of the optical signal that are reflected at the outer end of the at least one fiber tip 6 when the at least one fiber tip 4 is inserted into the at least one fluid and a second light signal that corresponds to parts of the optical signal that are reflected at the first additional reflector 5 when the at least one fiber tip 4 is inserted into the at least one fluid, a first determining device 12 that is configured to determine a difference of the optical phases of the first light signal and the second light signal, and a second determining device 13 that is configured to determine the temperature of the at least one fluid based on the difference of the optical phases of the first light signal and the second light signal.

When an optical signal, for example light, propagates in a medium, for example an optical fiber, the light wave undergoes a phase shift, wherein the phase shift can be defined as a function of the temperature. By further introducing a reference reflection, the accuracy of the determination of the temperature can be increased without having to costly amend the apparatus as such.

Thus, an improved apparatus for determining the temperature of at least one fluid 1 is provided.

Therein, the receiving device can for example be realized by a signal receiver. The first determining device and the second determining device can, for example, further be realized by code, that is stored in a memory and executable by a processor.

According to the embodiments of FIG. 1, a bare fiber tip, which has a length of approximately 10 mm, is used to probe the temperature of the fluid, which changes the refractive index of the corresponding fiber glass. Therein, the at least one fiber tip has been produced by cleaving the tip of the optical fiber 2 and removing the coating of the optical fiber over a section of about 10 mm.

Further, the first predetermined distance is approximately 10 mm, wherein the first additional reflector 5 has been introduced close to a transition between the at least one fiber tip 4 and the optical fiber 2, or close to the first end of the optical fiber 3, respectively, wherein the first additional reflector can for example be introduced by splicing, UV inscription, scrimping, e-beam writing, or any other known suitable method.

Therein, the corresponding phase change in the at least one fiber tip 4 is used as a measure for the temperature change based on the first additional reflector as measurement section.

Further, the optical source is configured in such a way that reflected signals from the fiber tip can be distinguished from additional reflection.

As shown in FIG. 1, the apparatus 1 further comprises a second additional reflector 14 that is introduced in the at least one fiber tip 4 at a predetermined distance from the first additional reflector.

For standard optical fibers the phase change over 10 mm and a temperature change of 8 K is approximately $2\pi$ and therefore, periodic over the temperature, wherefore in this case, the temperature determination is not unique anymore.

For this purpose, a second smaller reflection is introduced into the fiber tip 4, wherein, according to the embodiments of FIG. 1, this second additional reflector 14 is introduced into the fiber tip 4 approximately 1 mm after the first additional reflector 5, and wherein the second additional reflector can again, for example, be introduced by splicing, UV inscription, scrimping, e-beam writing, or any other known suitable method.

Therein, the second additional reflector 14 is used to increase the range of unique measurements. According to the embodiments of FIG. 1, the processing apparatus 8 is configured to determine the temperature of the at least one fluid by launching an optical signal into the optical fiber, wherein the receiving device 11 is configured to receive the first light signal, the second light signal and a third light signal that corresponds to parts of the optical signal that are reflected at the second additional reflector 14 when the at least one fiber tip 4 is inserted into the fluid, wherein the first determining device 12 is configured to determine a difference of the optical phases of the first light signal and the second light signal and a difference of the optical phases of the second light signal and the third light signal, and wherein the second determining device 13 is configured to determine the temperature of the at least one fluid based on the difference of the optical phases of the first light signal and the second light signal and the difference of the optical phases of the second light signal and the third light signal.

Further, although only one fiber tip is shown in FIG. 1, the apparatus can also comprise a plurality of fiber tips, wherein the apparatus can be configured in such a way that all fiber tips can simultaneously be inserted into a plurality of fluids in such a way that each of the plurality of fiber tips is inserted in a different one of the plurality of fluids, and wherein the processing apparatus is configured to determine the temperature of each of the plurality of fluids. For example, this can be achieved by using a 1×N fiber coupler and lead fibers and/or time-multiplexing the signals from the individual fiber tips via delay lines.

According to the embodiments of FIG. 1, the processing apparatus 8 is further a coherent optical time domain reflectometer 15.

Using the apparatus shown in FIG. 1, the temperature of a small fluid amount of for example 100 µl can be determined with a small fiber tip 4 without interfering with the temperature of the fluid, wherein a high measurement or determination speed, respectively, is enabled.

FIG. 2 illustrates a flowchart of a method for determining the temperature of at least one fluid 20 according to embodiments of the invention.

As shown in FIG. 2, the method 20 comprises a step 21 of inserting at least one fiber tip into at least one fluid, wherein the fiber tip is connected to an optical fiber, and wherein an additional first reflector is introduced into the at least one fiber tip at a first predetermined distance from an outer end of the at least one fiber tip, and a step 22 of determining the temperature of the at least one fluid, wherein the step 22 of determining the temperature of the at least one fluid comprises a step 23 of launching an optical signal into the optical fiber, a step 24 of receiving a first light signal that corresponds to parts of the optical signal that are reflected at the outer end of the at least one fiber tip and a second light signal that corresponds to parts of the optical signal that are reflected at the first additional reflector, a step 25 of determining a difference of the optical phases of the first light signal and the second light signal, and a step 26 of determining the temperature of the at least one fluid based on the difference of the optical phases of the first light signal and the second light signal.

According to the embodiments of FIG. 2, a second additional reflector is introduced into the at least one fiber tip at a second predetermined distance from the first additional reflectometer, wherein in step 24, the first light signal, the second light signal and a third light signal that corresponds to parts of the optical signal that are reflected at the second additional reflector when the at least one fiber tip is inserted into the fluid are received, wherein in step 25, a difference of the optical phases of the first light signal and the second light signal and a difference of the optical phases of the second light signal and the third light signal is determined, and wherein in step 26, the temperature of the at least one fluid is determined based on the difference of the optical phases of the first light signal and the second light signal and the difference of the optical phases of the second light signal and the third light signal.

Further, according to the embodiments of FIG. 2, a plurality of fiber tips are simultaneously inserted into a plurality of fluids in step 21 in such a way that each of the plurality of fiber tips is inserted in a different one of the plurality of fluids, and wherein the method 20 further comprises determining the temperature of each of the plurality of fluids, or wherein step 23 of determining the temperature of the at least one fluid is separately executed for each of the wells, respectively.

Therein, the method for determining the temperature of at least one fluid 20 shown in FIG. 2 can for example be used to monitor or determine the temperature during a biological or chemical test.

REFERENCE SIGNS 1 apparatus
2 optical fiber
3 first end
4 fiber tip
5 first additional reflector
6 outer end
7 second end
8 processing apparatus
9 optical source
10 signal processor
11 receiving device
12 first determining device
13 second determining device
14 second additional reflector
15 coherent optical time reflectometer
20 method
21 step
22 step
23 step
24 step
25 step
26 step

The invention claimed is:

1. An apparatus for determining the temperature of at least one fluid, wherein the apparatus comprises an optical fiber, wherein a first end of the optical fiber is connected to at least one fiber tip, and a first additional reflector introduced into the at least one fiber tip at a first predetermined distance from an outer end of the at least one fiber tip, and wherein a second end of the optical fiber is connected to a processing apparatus, wherein the processing apparatus comprises an optical source, wherein the optical source is configured to launch an optical signal into the optical fiber, and a coherent detector, wherein the coherent detector is configured to determine the temperature of at least one fluid by receiving a first light signal that corresponds to parts of the optical signal that are reflected at the outer end of the at least one fiber tip when the at least one fiber tip is inserted into the at least one fluid and a second light signal that corresponds to parts of the optical signal that are reflected at the first additional reflector when the at least one fiber tip is inserted into the at least one fluid, determining a difference of the optical phases of the first light signal and the second light signal, and determining the temperature of the at least one fluid based on the difference of the optical phases of the first light signal and the second light signal, wherein the at least one fiber tip is a bare fiber tip, and wherein the first additional reflector is configured to introduce a reference reflection to define a predetermined measurement section.

2. The apparatus according to claim 1, wherein the apparatus further comprises a second additional reflector that is introduced into the at least one fiber tip at a second predetermined distance from the first additional reflector.

3. The apparatus according to claim 2, wherein the coherent detector is configured to determine the temperature of the at least one fluid by receiving the first light signal, the second light signal and a third light signal that corresponds to parts of the optical signal that are reflected at the second additional reflector when the at least one fiber tip is inserted into the fluid, by determining a difference of the optical phases of the first light signal and the second light signal and a difference of the optical phases of the second light signal and the third light signal, and by determining the temperature of the at least one fluid based on the difference of the optical phases of the first light signal and the second light signal and the difference of the optical phases of the second light signal and the third light signal.

4. The apparatus according to claim 3, wherein the apparatus comprises a plurality of fiber tips, wherein the apparatus is configured in such a way that all fiber tips can simultaneously be inserted into a plurality of fluids in such a way that each of the plurality of fiber tips is inserted in a different one of the plurality of fluids, and wherein the signal processor is configured to determine the temperature of each of the plurality of fluids.

5. The apparatus according to claim 4, wherein the processing apparatus is a coherent optical time domain reflectometer.

6. The apparatus according to claim 3, wherein the processing apparatus is a coherent optical time domain reflectometer.

7. The apparatus according to claim 2, wherein the apparatus comprises a plurality of fiber tips, wherein the apparatus is configured in such a way that all fiber tips can simultaneously be inserted into a plurality of fluids in such a way that each of the plurality of fiber tips is inserted in a different one of the plurality of fluids, and wherein the signal processor is configured to determine the temperature of each of the plurality of fluids.

8. The apparatus according to claim 7, wherein the processing apparatus is a coherent optical time domain reflectometer.

9. The apparatus according to claim 2, wherein the processing apparatus is a coherent optical time domain reflectometer.

10. The apparatus according to claim 1, wherein the apparatus comprises a plurality of fiber tips, wherein the apparatus is configured in such a way that all fiber tips can simultaneously be inserted into a plurality of fluids in such a way that each of the plurality of fiber tips is inserted in a different one of the plurality of fluids, and wherein the signal processor is configured to determine the temperature of each of the plurality of fluids.

11. The apparatus according to claim 10, wherein the processing apparatus is a coherent optical time domain reflectometer.

12. The apparatus according to claim 1, wherein the processing apparatus is a coherent optical time domain reflectometer.

13. A system for determining the temperature of at least one fluid, wherein the system comprises at least one fluid reservoir and an apparatus for determining the temperature of at least one fluid according to claim 1, wherein the apparatus for determining the temperature of at least one fluid is configured to determine the temperature of at least one fluid contained in the at least one fluid reservoir.

14. A method for determining the temperature of at least one fluid, wherein the method comprises the steps of:
    inserting at least one fiber tip into at least one fluid, wherein the at least one fiber tip is connected to an optical fiber, and wherein an additional first reflector is introduced into the at least one fiber tip at a first predetermined distance from an outer end of the at least one fiber tip; and
    determining the temperature of the at least one fluid through a processing apparatus connected to a second end of the optical signal, wherein the determining the temperature of the at least one fluid comprises launching an optical signal into the optical fiber, receiving a first light signal that corresponds to parts of the optical signal that are reflected at the outer end of the at least one fiber tip and a second light signal that corresponds to parts of the optical signal that are reflected at the first additional reflector, determining a difference of the optical phases of the first light signal and the second light signal, and determining the temperature of the at least one fluid based on the difference of the optical phases of the first light signal and the second light signal,
    wherein the at least one fiber tip is a bare fiber tip, and wherein the first additional reflector is configured to introduce a reference reflection to define a predetermined measurement section.

15. The method according to claim 14, wherein a second additional reflector is introduced into the at least one fiber tip at a second predetermined distance from the first additional reflector, and wherein the step of determining the temperature of the at least one fluid comprises the steps of:
    launching an optical signal into the optical fiber;
    receiving the first light signal, the second light signal and a third light signal that corresponds to parts of the optical signal that are reflected at the second additional reflector when the at least one fiber tip is inserted into the fluid;
    determining a difference of the optical phases of the first light signal and the second light signal and a difference of the optical phases of the second light signal and the third light signal; and
    determining the temperature of the at least one fluid based on the difference of the optical phases of the first light signal and the second light signal and the difference of the optical phases of the second light signal and the third light signal.

16. The method according to claim 15, wherein a plurality of fiber tips are simultaneously inserted into a plurality of fluids in such a way that each of the plurality of fiber tips is inserted in a different one of the plurality of fluids, and wherein the temperature of each of the plurality of fluids is determined by the processing apparatus.

17. The method according to claim 15, wherein the coherent detector is a coherent optical time domain reflectometer.

18. The method according to claim 14, wherein a plurality of fiber tips are simultaneously inserted into a plurality of fluids in such a way that each of the plurality of fiber tips is inserted in a different one of the plurality of fluids, and wherein the temperature of each of the plurality of fluids is determined by the processing apparatus.

19. The method according to claim 18, wherein the coherent detector is a coherent optical time domain reflectometer.

20. The method according to claim 14, wherein the coherent detector is a coherent optical time domain reflectometer.

* * * * *